United States Patent
Moser et al.

(10) Patent No.: US 9,229,021 B2
(45) Date of Patent: Jan. 5, 2016

(54) MEASURING DEVICE WITH A MULTI-WALLED HOUSING

(75) Inventors: Thierry Moser, Sierentz (FR); Roland Unterseh, St. Louis (FR); Christian Waltenspuel, Riehen (CH)

(73) Assignee: ENDRESS + HAUSER FLOWTEC AG, Reinach (CH)

( * ) Notice: Subject to any disclaimer, the term of this patent is extended or adjusted under 35 U.S.C. 154(b) by 473 days.

(21) Appl. No.: 13/090,463

(22) Filed: Apr. 20, 2011

(65) Prior Publication Data
US 2012/0266671 A1 Oct. 25, 2012

(51) Int. Cl.
G01P 1/02 (2006.01)
G01L 19/14 (2006.01)
G01D 11/24 (2006.01)

(52) U.S. Cl.
CPC .......................... G01P 1/02 (2013.01)

(58) Field of Classification Search
USPC ..................................... 73/431, 855
See application file for complete search history.

(56) References Cited

U.S. PATENT DOCUMENTS

| | | | | |
|---|---|---|---|---|
| 2,362,304 A | * | 11/1944 | Reed et al. | 361/611 |
| 2,734,380 A | * | 2/1956 | Mittlemann | 73/861.12 |
| 2,932,546 A | | 7/1957 | Marggraf | |
| 3,347,418 A | * | 10/1967 | Fefferman | 222/61 |
| 4,061,032 A | * | 12/1977 | Friebel | 73/273 |
| 4,530,238 A | * | 7/1985 | Hayman | 73/431 |
| 4,734,971 A | * | 4/1988 | Dupasquier | 29/417 |
| 4,825,703 A | * | 5/1989 | Kubota | 73/861.12 |
| 5,369,979 A | * | 12/1994 | Aylsworth et al. | 73/24.01 |
| 5,727,110 A | * | 3/1998 | Smith et al. | 385/147 |
| 5,866,815 A | * | 2/1999 | Schwald et al. | 73/290 V |
| 6,365,244 B1 | | 4/2002 | Ren | |
| 6,568,266 B1 | * | 5/2003 | Desa et al. | 73/431 |
| 7,060,350 B2 | * | 6/2006 | Takaya et al. | 428/323 |
| 7,099,155 B2 | * | 8/2006 | Kobayashi et al. | 361/719 |
| 8,033,183 B2 | * | 10/2011 | Reichart et al. | 73/861.11 |
| 2003/0089512 A1 | | 5/2003 | Faltin | |
| 2008/0310131 A1 | * | 12/2008 | Fino et al. | 361/758 |

FOREIGN PATENT DOCUMENTS

| | | |
|---|---|---|
| DE | 35 37 669 A1 | 4/1987 |
| DE | 42 13 758 A1 | 12/1993 |
| DE | 296 08 312 U1 | 9/1996 |

(Continued)

OTHER PUBLICATIONS

Bibliographic Data with Description Machine Translation of DE102005060208, Date: Jun. 21, 2007, Date of Translation: Aug. 1, 2013, Translation by: Espacenet, European Patent Office.*

(Continued)

Primary Examiner — Harshad R Patel
(74) Attorney, Agent, or Firm — Bacon & Thomas, PLLC

(57) ABSTRACT

A measuring device for determining and/or monitoring a chemical and/or physical measured variable of process automation technology, wherein the measuring device includes at least one housing, and the housing has at least a first wall; which comprises a first material, and the housing has at least a second wall which comprises at least a second material. The second wall is secured to the first wall; and the outside of the first wall is at least partially surrounded by the second wall. The second wall is approximately fitted to the shape of the first wall, and the second wall is mechanically connected to the first wall.

25 Claims, 2 Drawing Sheets

(56) References Cited

FOREIGN PATENT DOCUMENTS

| | | | |
|---|---|---|---|
| DE | 201 16 141 U1 | 3/2003 | |
| DE | 102 22 975 C1 | 11/2003 | |
| DE | 698 12 182 T2 | 12/2003 | |
| DE | 102005060208 A1 * | 6/2007 | ............ G01F 1/58 |
| DE | 10 2008 042 972 | 4/2010 | |
| EP | 0219639 | 4/1987 | |
| EP | 0560191 | 1/1993 | |
| GB | 2 313 488 A | 11/1997 | |
| WO | WO 93/05399 | 3/1993 | |
| WO | WO 98/24695 | 6/1998 | |
| WO | WO 2011/031422 A2 | 3/2011 | |

OTHER PUBLICATIONS

Author: Vukota Boljanovic, Title: "Metal Shaping Processes Casting and Molding; Particulate Processing; Deformation Processing; and Metal Removal", Date: Dec. 2005, Publisher: Industrial Press, pp. 1—Overview and Features.*

Author: unknown, Title: Surface Roughness Measurement, Bulletin No. 1984, Date: Dec. 2009, Publisher: Mitutoyo America Corporation, pp. 1-8.*

German Search Report, Apr. 4, 2010, corresp. to German Patent Application DE102008042972.

* cited by examiner

MEASURING DEVICE WITH A MULTI-WALLED HOUSING

TECHNICAL FIELD

The invention relates to a measuring device of process automation technology for determining and/or monitoring a chemical and/or physical measured variable, wherein the measuring device has at least one housing.

BACKGROUND DISCUSSION

Electronic apparatuses, which are so embodied that they satisfy ignition protection type Ex-d, must a have pressure resistant housing or a pressure resistant housing part. In this way, it is prevented that an explosion possibly occurring in the interior of the housing or in a portion of the interior of the housing can penetrate outwardly or into another portion of the interior, e.g. to the electronics in an adjoining space. In the standard, minimum values for the length and size of slits or gaps etc. between portions of the interior are fixed so that the slits or gaps etc. are flameproof.

In order that housings having pressure resistant parts have a sufficient mechanical strength, they are embodied with thick walls; thus, they are heavy and expensive. Constructing an electronic apparatus according to the ignition protection type Ex-d consequently requires a pressure resistant and therefore heavy and expensive, closed housing, or a housing with a correspondingly dimensioned housing part.

Housings for industrial applications include, for example, housings for accommodating the electronics of a measuring device, e.g. a pressure, fill level or flow measuring device. Such housings have a removable lid, e.g. so that the electronics is accessible for adjusting or parametering the same at the measuring location.

To allow such a housing to be applied in the food industry, it must satisfy special requirements. In this connection, there are hygienic requirements, according to which all seals contacting food must be replaceable; the housings have to be completely cleanable and the housings must have as few undercuts, in which deposits can accumulate, as possible. Additionally, the sealing of the housing must be assured in the face of long term utilization. This must also be assured inspite of its being cleaned regularly, e.g. by means of high pressure steam cleaning used in the foods industry. The pharmaceutical industry has comparable requirements. Moreover, housings for industrial applications must be corrosion resistant and chemically resistant.

Housings are commercially obtainable, in the case of which a lid is screwed onto a housing pot by means of a multiple start thread. The lid and housing pot are usually castings of aluminum or stainless steel. Such components are expensive. In order to assure a sufficient mechanical stability, these housings must have a wall thickness of at least four millimeters due to the screw thread. This wall thickness places a lower limit on the amount of material needed for the housing and therewith a lower limit for the weight of the housing.

Additionally, housings for industrial applications usually have a housing pot and a removable lid. Such arrangements are most often installed in the vicinity of the process or the medium to be measured and frequently are exposed to unfavorable process conditions reigning there, such as e.g. high environmental temperatures and heavy fouling or also rain, wind, dust, snow and ice in the case of an installation in the open.

It has been found that the screw connections usually used to connect a metal lid to a metal housing tend to seize. They can, after a certain length of time, no longer, or only with considerable effort, be loosened and, in individual cases, have to be broken or cut open.

A measure applied to this point in time to avoid the seizing of screw connections is the complete coating of the lid and housing, wherein, depending on the metal material of the lid or housing, a nickel coating, a lubricating lacquer or other powder coating, or an anodized or hard anodized aluminum coating is applied. A usual method is an immersion bath with a liquid providing the coating. The parts to be coated are completely immersed in the liquid. In cases where, for lids or housings of the past, no coating was desired, the concerned surface portion was covered by a lacquer or an adhered film before immersion in the coating bath. After the coating immersion bath, the covering must usually be removed, which is not only an additional working step but also requires the additional expense of a solvent.

Moreover, it should be noted that a complete coating of the lid and housing is complicated, expensive and not very environmentally friendly, because it requires a long residence time for the parts to be coated in the coating process.

SUMMARY OF THE INVENTION

An object of the invention is to provide a measuring device of process automation technology, which is robust, hermetically sealed and cost effective to manufacture.

According to the invention, the object is achieved by features including that the housing has at least a first wall, the first wall comprises a first material, the housing has at least one second wall, the second wall comprises at least a second material, the second wall is secured to the first wall; and the outside of the first wall is at least partially surrounded by the second wall, the second wall is approximately matched to the shape of the first wall, and the second wall is mechanically connected to the first wall.

The covering with the second wall protects the measuring device against environmental influences, for example, corrosive influences. In the state of the art, a protecting covering is applied to the first wall through a chemical method. The thereby occurring jacketing is, however, correspondingly thin and has a thickness of only a few millimeters or even micrometers and is easy to penetrate or remove. The idea of the invention is to apply a second wall, which is at least roughly matched to the shape of the measuring device, to the outside of the measuring device and to mechanically connect this second wall with the first wall of the housing. Significant cost savings can be achieved by using a suitable combination of materials. In order to meet, e.g. an Ex-d standard, or in order to have a certain corrosion resistance, the first and second material can be suitably selected and matched to one another without the entire housing having to comprise a solid and most often expensive material, which meets the desired requirements. Through the covering of the first wall of the housing by the second wall, for example, a standard basic housing comprising only the first wall can be covered by a second wall, so that the housing can be matched to the special operating conditions of a measuring device of process automation technology. In this regard, the second material selected can be especially temperature resistant or especially corrosion resistant. On the other hand, in case an explosion or overpressure resistant housing is to be manufactured, the first material of the first wall can be so selected or designed such that it has, for example, a certain thickness, so that the process medium cannot escape from the housing.

In an embodiment, the first wall serves at least partially as a carrier for the second wall. That means that the second wall lies at least partially on the first wall and/or is supported by it. The second wall can be matched to the shape of the first wall for this purpose. In such a case the second wall can lie gap free on the first wall.

In an additional embodiment, a measuring and/or operating electronics is arranged in the housing. Often, measuring devices have a second housing or housing part, in which a measuring and/or operating electronics is accommodated, isolated, for example, from the measuring transducer. These housing sections must be isolated from one another to be explosion safe. Additionally, the measuring and/or operating electronics must be protected by the housing from damaging, environmentally related influences.

In a form of embodiment, the second wall closes off the housing from the environment. Especially, for example, for openings of the housing provided for process connections, the second wall forms the environmental side, termination of the housing. Advantageously, the second wall surrounds at least 50%, preferably at least 75% of the environmental side surface of the housing. Preferably, however, the outside of the housing is completely surrounded by the second wall so that a cross section through the longitudinal axis of the housing always extends through the first and the second wall.

In an additional form of embodiment, the second wall has an average surface roughness Re less than or equal to 1.6 μm. Preferably, the surface roughness Ra of the second wall amounts to less than or equal to 0.8 μm. Depending on the surface roughness of the second wall, the use of the housing or the measuring device is permitted in pharmaceutical and/or food manufacturing, process plants.

In a further development, the first wall of the housing is produced by means of a casting method, especially by means of an injection molding method. By means of the injection molding method, cast parts such as the housing can be cost effectively manufactured exactly and in large quantities.

In a variant, the second wall of the housing is embodied mechanically by means of a deep draw method such that the second wall fits the first wall. Through the deep draw method, the second material can be changed in shape and, thus, form a second wall for the housing that fits the first wall.

In an embodiment, the second wall of the housing is connected mechanically to the first wall by means of a crimping method. For example, the second wall is secured around the first wall on a shoulder or the edge of an opening by crimping. A mechanical bond of high stability arises from the crimping. Additionally, in contrast to a fastening by means of screws, nails or a similar securement means, the crimping creates no gaps or undercuts in which deposits can form.

In a form of embodiment, the first and the second walls of the housing are at least partially isolated from one another by a hollow space. Through an inexact matching of the second wall to the first wall, or due to manufacturing tolerances, a hollow space can come between the first wall and second wall. Advantageously, this hollow space can be filled with an electrically and/or thermally insulating material.

In an embodiment, the first material is essentially aluminum. Especially, injection molded aluminum is light, withstands very high temperatures, offers a high loadability and strength and has an excellent corrosion resistance as well.

In a further development, the second material is a sheet material, especially a non-rusting, or stainless, metal sheet material. Since sheet materials are easily processed, especially easily deformed and easily edged, manufactured products, processing and fitting to the particular housing form or shape of the first wall is especially simple. Additionally, sheet materials can be so handled and further processed that especially their surfaces meet the highest requirements as regards durability and surface roughness.

In a further development, the average thickness of the first wall is greater than the average thickness of the second wall. As a result, the housing comprises a substantial supporting member—the first wall—and a covering—the second wall. The first wall can comprise, for example, a cost effective first material that satisfies given, minimum requirements. The first material has a first thickness to contribute a determined stability to the housing. The second wall, with a second thickness less than the first thickness, is secured to the first wall. Its material is selected corresponding to the process conditions at the location of use of the measuring device. Of advantage in such a case is the resulting cost saving, since through the second wall, the entire housing must no longer comprise the, in given cases, more expensive, higher value second material.

In a variant, the housing is pressure tight and/or explosion safe. In order to embody a pressure tight and/or explosion safe housing corresponding to the legally prescribed standards, among other things, sufficient wall thicknesses and seals of the openings present in the housing are provided. If the openings in a housing are, for example, sealed by means of screw threads, then sufficient screw threads and a determined wall thickness are provided, in order to guarantee the explosion safety and/or pressure resistance.

In an embodiment, the housing is closable through the use of at least one housing lid, wherein the housing lid, analogously to the housing, is constructed of the first wall composed of the first material and the second wall composed of the second material; wherein the first wall of the housing lid is provided with a first securement means; wherein the first wall of the housing is provided with a second securement means; wherein the first and the second securement means are so arranged that the housing lid is connectable to the housing and the environmental side of the housing is surround by the second wall.

BRIEF DESCRIPTION OF THE DRAWINGS

The invention will now be explained in greater detail based on the appended drawing, the figures of which show as follows.

DETAILED DISCUSSION IN CONJUNCTION WITH THE DRAWINGS

Figure 1:
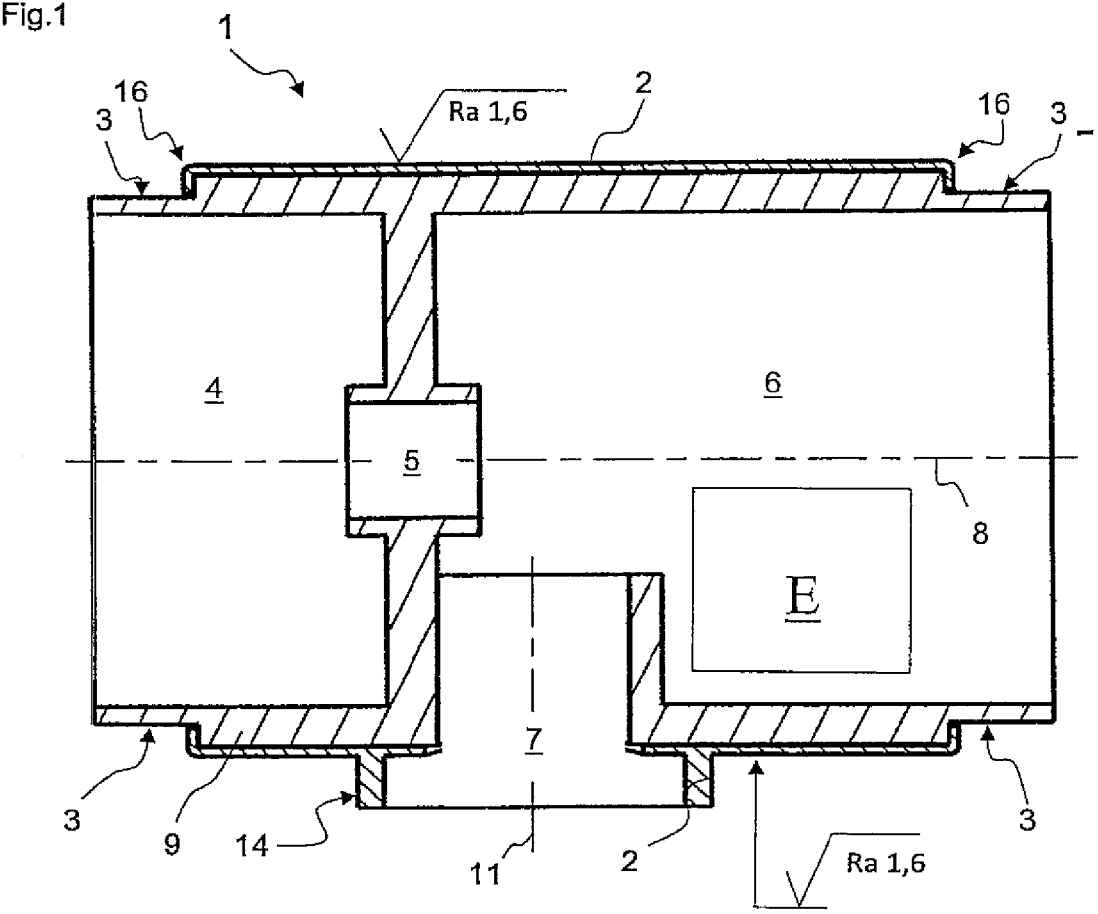
FIG. 1 is a cross section through a housing of a measuring device of process automation technology.

FIG. 1 shows a cross section through a housing 1 of a measuring device of process automation technology. Housing 1 comprises two walls 2, 9. In such a case, the first wall 9, manufactured by means of an injection molding or pressure casting method, most often has a thickness that is greater than the thickness of the second wall 2. Except for the region in which the external threads 3 are applied to the first wall 9 of the, housing 1, the first wall 9 is covered externally by the second wall 2. The second wall 2 is fitted to the basic cylindrical shape formed by the first wall 9. The first wall 9 includes shoulders 16, around which the second wall 2 is crimped. These shoulders 16 are located directly adjoining the external threads 3 cut into the ends of the first wall 9.

Figure 4:
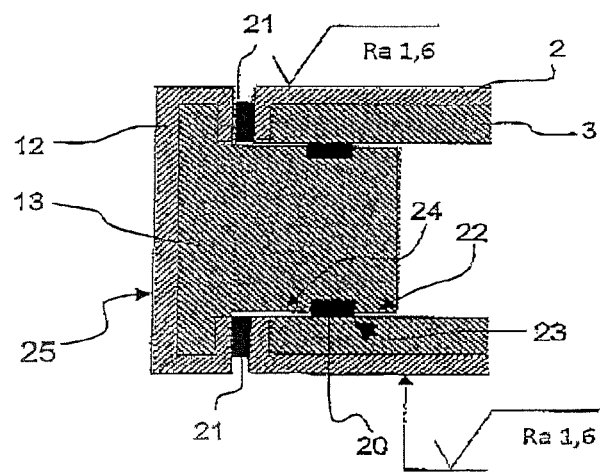
FIG. 4 is a cross section through a housing lid applied to a housing, showing the sealing of the resulting arrangement.

The screw threads 3 provided on the first wall 9 can, however, be internal threads 23 in the first wall 9, as shown in FIG. 4, so that the housing 1 can be completely covered by the second wall. Housing lids 10, an example of which is shown in FIG. 2, can be applied to the external threads 3, in order to seal the housing 1 relative to the environment.

Housing 1 is T-shaped in the cross section containing its longitudinal axis 8 and the transverse axis 11. Moreover, the housing 1 is divided into an electronics compartment 6 and an explosion proof connection space 4. A first explosion resistant cable feedthrough 5 is provided between the electronics compartment 6 and the connection space 4. Furthermore, a second cable feedthrough 7 is provided between the housing 1 and the sensor element SE. The second wall 2 has, moreover, a socket 14, which serves as a connection nozzle to connect the housing 1 with the sensor element SE.

Between the first and the second walls 2, 9, an insulating material can be applied for the electrical and/or thermal insulation of the housing interior 4, 5, 6, 7, comprising the electronics compartment, the connection space and the line feedthroughs.

Figure 2:
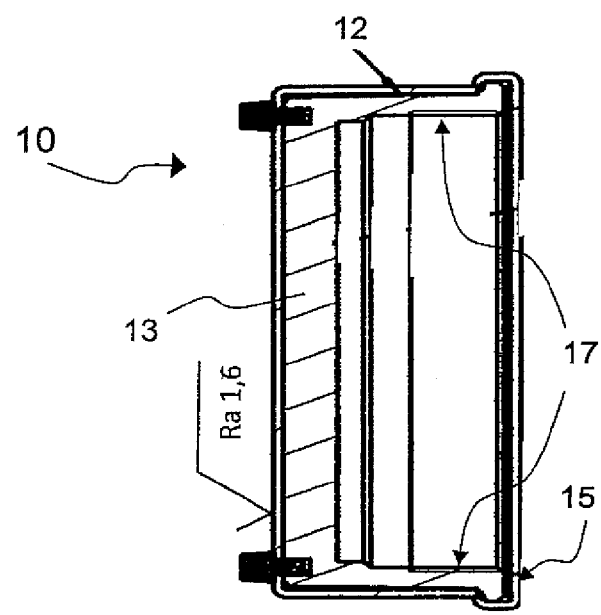
FIG. 2 is a cross section through a housing lid.

FIG. 2 shows a housing lid 10 mountable on the housing 1. The housing lid 10 likewise comprises two walls 12, 13, which are constructed analogously to those of the housing 1. The second wall 12, in such a case, is crimped around the first wall 13. The housing lid 10 has an internal thread 17, by means of which it can be screwed onto the external thread 3 provided on the housing 1. The internal thread 17 located in the housing lid 10 is cut into the first wall 9 composed of the first material. The external thread 3 on the housing 1 is likewise cut into the first wall 9 composed of the first material. By screwing together the housing lid 10 and the housing 1, the first wall 13 of the housing lid 10 is thus connected to the first wall 9 of the housing 1. Additionally, through the screwing together, the second wall 12 of the housing lid 10 is pressed against the second wall 9 of the housing 1 in the region in which the housing lid 10 is screwed onto the housing 1. In such a case, the housing lid 10 is frictionally locked to the housing 1 by the L-shaped crimping 15 of the housing lid and the L-shaped crimping in the region of the shoulder 16 of the housing 1. A sealing ring 21 is applied as a sealing element between the second wall 12 of the housing lid 10 and the second wall 2 of the housing 1. The sealing ring is pressed against the housing 1 by screwing the housing lid 10 tight.

In addition to the crimping, other connecting elements, for example, in the form of screws, nails, pins, bolts or the like can be introduced into the first and/or second wall.

Figure 3:
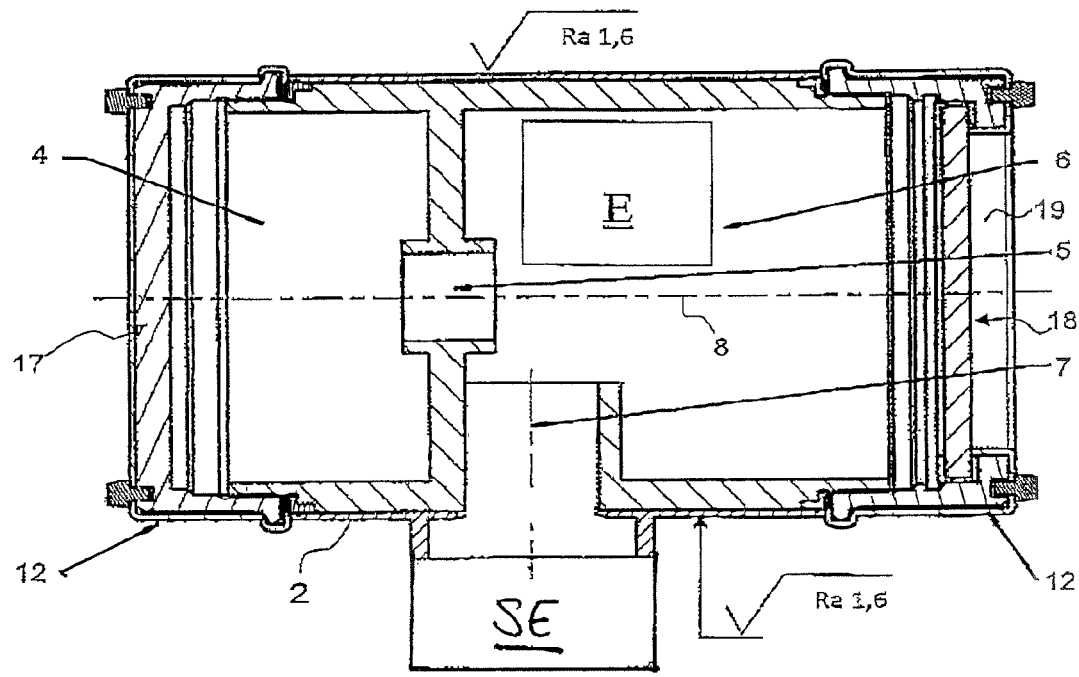
FIG. 3 is a cross section through the housing enclosed by means of two housing lids.

FIG. 3 shows a housing 1 closed by two housing lids 10, 18. In such a case, the first housing lid 10 shown in FIG. 2 closes a first opening in the housing 1. The second housing lid 18 has for example, a window 19 of glass and closes a second opening in the housing 1. The housing interior 4, 5, 6, 7 is sealed from the environment by screwing on the housing lids 17, 18 and is surrounded by the second wall 2. Additionally, the window 19 in the second housing lid 18 is affixed by screwing the second housing lid 18 on the screw thread 3.

FIG. 4 shows a housing lid 25 having an external thread 22, 24 screwed into an internal thread 23 of the housing 1. In this embodiment, the housing 1 has an internal thread 23 and the housing lid has a matching external thread 22, 24. The housing lid 25 has at least one essentially radially extending cavity along its thread 22, 24. The cavity runs around the first wall of the housing lid in the region of the inner thread 22, 24 and thereby divides the internal thread 22, 24 into a first threaded section 22 and a second threaded section 24. The course of the inner thread 23 is thus interrupted by the cavity. A sealing element, in the form of a sealing ring 20, is inserted into the cavity. Of advantage in the case of such an embodiment is that the sealing ring 20 cannot be pressed outward in the case of an overpressure in the housing interior 4, 5, 6, 7, such as possible, for example, in the state of the art solution, in which the sealing ring 21 is applied between the shoulder 16 of the housing 1 and the housing lid 25.

The invention claimed is:

1. A measuring device of process automation technology for determining and/or monitoring a chemical and/or physical, measured variable, said measuring device comprising:
    at least one housing;
    wherein:
    said housing comprises a first wall and a second wall, said first wall comprising a first material and said second wall comprising at least a second material, said second wall being secured to said first wall,
    said first wall being at least partially surrounded on the outside by said second wall, and thus being at least partially covered by said second wall,
    said second wall being at least approximately fitted to the shape of said first wall,
    said second wall being mechanically connected to said first wall,
    said first wall supports said second wall,
    wherein a measuring and/or operating electronics is arranged in the interior of said housing; and
    wherein said first wall features an at least partially cylindrical shape.

2. The measuring device as claimed in claim 1, wherein:
    said first wall of said at least one housing is produced by means of an injection molding method.

3. The measuring device as claimed in claim 1, wherein:
    said second wall seals said at least one housing from the environment.

4. The measuring device as claimed in claim 1, wherein:
    said second wall has a surface roughness Ra less than or equal to 1.6 μm.

5. The measuring device as claimed in claim 1, wherein:
    said first wall of said at least one housing is produced by means of a casting method.

6. The measuring device as claimed in claim 1, wherein:
    said second wall of said at least one housing is formed mechanically by means of a deep draw method such that said second wall fits said first wall.

7. The measuring device as claimed in claim 1, wherein:
    said second wall of said at least one housing is mechanically connected to said first wall by means of a crimping method.

8. The measuring device as claimed in claim 7, wherein the first wall includes shoulders, around which the second wall is crimped.

9. The measuring device as claimed in claim 1, wherein:
    said first and said second walls of said at least one housing are at least partially isolated from one another by a hollow space.

10. The measuring device as claimed in claim 1, wherein:
    said first material comprises aluminum.

11. The measuring device as claimed in claim 1, wherein:
    said second material is a sheet material.

12. The measuring device as claimed in claim 1, wherein:
    the average thickness of said first wall is greater than the average thickness of said second wall.

13. The measuring device as claimed in claim 1, wherein:
    said at least one housing is pressure tight and/or explosion safe.

14. The measuring device as claimed in claim 1, wherein:
said at least one housing is closable by at least one housing lid;
said housing lid is constructed analogously to said at least one housing namely such that said housing lid includes a first wall comprising the first material and a second wall comprising the second material;
a first securement means is provided on said first wall of said housing lid;
a second securement means is provided on said first wall of said at least one housing; and
said first and said second securement means are so arranged that said housing lid is connectable to said at least one housing and said at least one housing is surrounded on the outside by said second wall.

15. The measuring device as claimed in claim 1, wherein:
said second material is a non-rusting or stainless, metal sheet material.

16. The measuring device as claimed in claim 1, wherein:
the first wall includes shoulders, around which the second wall is crimped.

17. The measuring device as claimed in claim 1, wherein:
the second wall is fitted to the basic cylindrical shape formed by the first wall.

18. The measuring device as claimed in claim 1, wherein:
the second wall is secured around the first wall on a shoulder or the edge of an opening of the first wall by crimping.

19. The measuring device as claimed in claim 1, wherein:
the second wall has a socket which serves as a connection nozzle to connect the housing with a sensor element.

20. The measuring device as claimed in claim 1, wherein said housing has a housing part in which said measuring and/or operating electronics is separately accommodated from a sensor element.

21. The measuring device as claimed in claim 1, wherein a cable feedthrough is provided between the housing and a sensor element.

22. The measuring device as claimed in claim 1, wherein said housing comprises a T-shaped section in a cross section containing its longitudinal axis and the transverse axis wherein the cable feedthrough represents one ending of the T-shape.

23. The measuring device as claimed in claim 1, wherein said housing is divided into an electronics compartment and an explosion proof connection space.

24. The measuring device as claimed in claim 23, wherein an explosion resistant cable feedthrough is provided between the electronics compartment and the connection space.

25. A measuring device of process automation technology for determining and/or monitoring a chemical and/or physical, measured variable, said measuring device comprising:
at least one housing;
wherein:
said housing comprises a first wall and a second wall, said first wall comprising a first material, and said second wall comprising at least a second material,
said first wall being at least partially surrounded on the outside by said second wall, and thus being at least partially covered by said second wall,
said second wall being at least approximately fitted to the shape of said first wall,
said second wall being secured to said first wall by a mechanical bond,
and said first wall supports said second wall,
wherein a measuring and/or operating electronics is arranged in the interior of said housing; and
wherein said first wall features an at least partially cylindrical shape.

* * * * *